United States Patent
Zhang et al.

(10) Patent No.: US 12,303,069 B2
(45) Date of Patent: May 20, 2025

(54) OVEN

(71) Applicant: SHINERICH INDUSTRIAL LTD., Shenzhen (CN)

(72) Inventors: Guangrong Zhang, Shenzhen (CN); Bo Xie, Shenzhen (CN)

(73) Assignee: SHINERICH INDUSTRIAL LTD., Shenzhen (CN)

( * ) Notice: Subject to any disclaimer, the term of this patent is extended or adjusted under 35 U.S.C. 154(b) by 365 days.

(21) Appl. No.: 17/975,813

(22) Filed: Oct. 28, 2022

(65) Prior Publication Data

US 2024/0023754 A1 Jan. 25, 2024

Related U.S. Application Data

(63) Continuation of application No. PCT/CN2022/119130, filed on Sep. 15, 2022.

(30) Foreign Application Priority Data

Jul. 21, 2022 (CN) .......................... 202210867640.7

(51) Int. Cl.
*A47J 37/07* (2006.01)

(52) U.S. Cl.
CPC .... *A47J 37/0704* (2013.01); *A47J 2037/0795* (2013.01)

(58) Field of Classification Search
CPC ... F24B 1/182; F24B 5/08; F24B 1/207; A47J 37/0704
See application file for complete search history.

(56) References Cited

U.S. PATENT DOCUMENTS

| | | | |
|---|---|---|---|
| 6,615,821 B1 * | 9/2003 | Fisenko | A47J 37/0704 126/77 |
| 10,222,092 B1 * | 3/2019 | Traeger | F24B 3/00 |

(Continued)

FOREIGN PATENT DOCUMENTS

| | | |
|---|---|---|
| CN | 101554296 A | 10/2009 |
| CN | 203314790 U | 12/2013 |

(Continued)

OTHER PUBLICATIONS

International Search Report and Written Opinion issued in corresponding PCT Application No. PCT/CN2022/119130, dated Apr. 16, 2023.

(Continued)

*Primary Examiner* — Alfred Basichas
(74) *Attorney, Agent, or Firm* — Westbridge IP LLC (57) ABSTRACT

Disclosed is an oven, including a body assembly, an air inlet cylinder and a support member. The body assembly mounted on the support member includes a body, a top cover and an enclosure; the body includes a bottom plate and a side plate which includes a top end and a bottom end; the bottom plate is provided with a first air inlet hole, a side of the side plate near the top end is provided with a second air inlet hole; the enclosure is provided around the side plate, the enclosure, the side plate and the top cover form a first air inlet channel; an inner cavity in the body is communicated with the first air inlet channel through the second air inlet hole; an air inlet cylinder in the inner cavity is provided with a second air inlet channel for air entering the inner cavity from the outside.

10 Claims, 5 Drawing Sheets

(56) References Cited

U.S. PATENT DOCUMENTS

| | | | |
|---|---|---|---|
| 11,278,153 B2 | 3/2022 | Stoltzfus | |
| 2007/0017500 A1 | 1/2007 | Chen | |
| 2015/0285507 A1* | 10/2015 | Troyer, Jr. | F24B 1/182 |
| | | | 126/30 |
| 2021/0045578 A1* | 2/2021 | Stoltzfus | F24B 1/191 |
| 2021/0282592 A1* | 9/2021 | Jan | A47J 37/079 |
| 2022/0178545 A1* | 6/2022 | Hale | F24B 1/195 |
| 2023/0243506 A1* | 8/2023 | Young | F24B 1/202 |
| | | | 126/30 |
| 2023/0397760 A1* | 12/2023 | Zeitler | A47J 37/0772 |

FOREIGN PATENT DOCUMENTS

| | | |
|---|---|---|
| CN | 104159483 A | 11/2014 |
| CN | 211559772 U | 9/2020 |
| CN | 217959777 U | 12/2022 |
| DE | 202019105975 U1 | 1/2020 |
| EP | 3155938 A1 | 4/2017 |
| KR | 20140078850 A | 6/2014 |
| KR | 20150133109 A | 11/2015 |
| KR | 102363681 B1 | 2/2022 |
| WO | 2016075646 A1 | 5/2016 |
| WO | 2021011158 A1 | 1/2021 |

OTHER PUBLICATIONS

Extended European Search Report issued in counterpart European Patent Application No. 22792741.5, dated Dec. 20, 2024.

* cited by examiner

OVEN

CROSS-REFERENCE TO RELATED APPLICATIONS

The present application is a continuation application of International Application No. PCT/CN2022/119130, filed on Sep. 15, 2022, which claims priority to Chinese Patent Application No. 202210867640.7, filed on Jul. 21, 2022, the entire contents of which are incorporated herein by reference.

TECHNICAL FIELD

The present application relates to the technical field of ovens, and in particular to an oven.

BACKGROUND

Most ovens on the current market burn wood or granular fuel. Most ovens are cylindrical shape due to the requirement of containing fuel, and the fuel is placed at the bottom of the cylinder for burning. Due to the limited size of the cylinder and insufficient air in the cylinder, the combustion of the fuel in the oven is insufficient, the smoke easily comes out and toxic gases are generated.

Thus, it is necessary to provide a new oven to solve or at least alleviate the above technical defects.

SUMMARY

The main purpose of the present application is to provide an oven to solve the technical problem of insufficient combustion of the fuel in the oven of the prior art.

In order to achieve the purpose, the present application provides an oven, including:
 a body assembly including a body, a top cover and an enclosure;
 the body including a bottom plate and a side plate mounted on the bottom plate;
 the side plate including a top end and a bottom end opposite to the top end;
 the bottom plate being provided with a first air inlet hole, a side of the side plate near the top end being provided with a second air inlet hole;
 the enclosure being provided around the side plate, wherein the enclosure, the side plate and the top cover form a first air inlet channel, and the body is provided with an inner cavity;
 the inner cavity being communicated with the first air inlet channel through the second air inlet hole, and the inner cavity being communicated with an outside through the first air inlet hole and the first air inlet channel;
 an air inlet cylinder provided in the inner cavity, and provided with a second air inlet channel for air entering the inner cavity from the outside; and
 a support member, the body assembly being mounted on the support member.

In an embodiment, the second air inlet channel includes an air inlet and an air outlet, the air inlet cylinder is provided with a housing, the air inlet is located at a bottom of the housing and the air outlet is located on a side wall of the housing, to allow an outside air to enter from the air inlet and enter the inner cavity from the air outlet.

In an embodiment, the air outlet includes a third air inlet hole provided at a top of the side wall of the housing and a fourth air inlet hole provided at an end of the side wall of the housing near the bottom of the housing.

In an embodiment, the bottom plate is provided with an annular outer edge extending to the enclosure, the annular outer edge is provided with ventilation ports spaced circumferentially, and the ventilation ports are configured to communicate the outside air with the first air inlet channel.

In an embodiment, the oven further includes a charcoal basin and a baking net assembly, the top cover is provided with a fire collection hole, the charcoal basin is mounted in the fire collection hole;
 a bottom of the charcoal basin is provided with a groove and an ignition hole, the ignition hole is configured to communicate the groove with the inner cavity; and
 the baking net assembly is located on a side of the charcoal basin directly facing the groove.

In an embodiment, the support member is mounted with a baking net bracket, the baking net bracket includes a first cylinder-shaped mounting member, the first cylinder-shaped mounting member is provided with a positioning hole;
 the baking net assembly includes a baking net, a mounting bracket and a pin, the baking net is mounted on the mounting bracket;
 the mounting bracket includes a second cylinder-shaped mounting member, the second cylinder-shaped mounting member is provided with a plurality of adjustment holes that are spaced about an axis of the second cylinder-shaped mounting member;
 the first cylinder-shaped mounting member is sleeved on the second cylinder-shaped mounting member; and
 the pin is inserted into the positioning hole and one of the plurality of adjustment holes to lock the first cylinder-shaped mounting member and the second cylinder-shaped mounting member.

In an embodiment, the second cylinder-shaped mounting member is further provided with penetration holes opposite to the plurality of adjustment holes, the number of penetration holes is equal to the number of adjustment holes, and the penetration holes correspond to the adjustment holes one-in-one.

In an embodiment, the mounting bracket is provided with a clamping groove, a size of a bottom of the clamping groove is larger than a size of an opening of the clamping groove;
 the mounting bracket further includes a first lapping rod and a second lapping rod, the first lapping rod is clamped to the clamping groove, the second lapping rod is provided with a concave portion, and the concave portion is abutted against the second cylinder-shaped mounting member.

In an embodiment, the oven further includes an ash tray, the ash tray is provided on a side of the body near the bottom plate, the ash tray includes a ventilation hole and an annular groove, the annular groove is provided directly under the first air inlet hole, and the air inlet cylinder faces the ventilation hole.

In an embodiment, the support member includes limiting members distributed circumferentially, and the ash tray is movable upward among the limiting members.

In the above technical solution, the present application provides an oven, including a body assembly, an air inlet cylinder, and a support member. The body assembly includes a body, a top cover and an enclosure. The body includes a bottom plate and a side plate mounted on the bottom plate; the side plate includes a top end and a bottom end opposite to the top end; the bottom plate is provided with a first air inlet hole, a side of the side plate near the top end is provided with a second air inlet hole; the enclosure is provided around the side plate, the enclosure, the side plate and the top cover form a first air inlet channel, and the body is provided with an inner cavity; the inner cavity is communicated with the first air inlet channel through the second air inlet hole, and the inner cavity is communicated with an outside through the first air inlet hole and the first air inlet channel; an air inlet cylinder is provided in the inner cavity, and provided with a second air inlet channel for air entering the inner cavity from the outside; and a support member, the body assembly is mounted on the support member. The fuel is placed in the inner cavity for combustion and the outside air is supplied first from the first inlet hole on the bottom plate of the oven for the combustion of fuel on the bottom plate. In addition, during the combustion of the fuel in the oven, the oven is heated and the outside air is heated by the side plate to move upward from the bottom of the first air inlet channel and then flows into the inner cavity through the second air inlet hole for supplying to an end of the combustion flame for the air secondary supplying to the inner cavity, to promote full combustion of insufficiently combusted fuel. In addition, during the combustion process, the air inlet cylinder is heated and the air at the bottom of the air inlet cylinder is at a higher temperature, the air below the air inlet cylinder will enter the inner cavity from the second inlet channel for the air supplying to the center of the combustion flame, to promote full combustion of the fuel at the center of the combustion flame. In this way, the air is first supplied through the first air inlet hole, and then the air is secondly supplied to an end of the combustion flame through the first air inlet channel and the second air inlet hole, and a supplemental air is supplied to the center of the combustion flame through the second air inlet channel, to ensure the full combustion of the fuel, to increase the fire temperature and reduce the generation of smoke or toxic gases, and also provide a special flame effect. The present application supplies air through multiple paths to ensure sufficient air supply, such that the fuel is sufficiently combusted.

BRIEF DESCRIPTION OF THE DRAWINGS

In order to more clearly illustrate the embodiments of the present application or the technical solutions in the prior art, the following is a brief description of the drawings in the description of the embodiments or the prior art. Obviously, the drawings in the following description are only some of the embodiments of the present application, and other drawings can be obtained by those skilled in the art, without any creative work, according to the structure shown in these drawings.

The realization of the purpose, functional features and advantages of the present application will be further described in conjunction with the embodiments, with reference to the drawings.

DETAILED DESCRIPTION OF THE EMBODIMENTS

The technical solutions in the embodiments of the present application will be clearly and completely described below in conjunction with the drawings in the embodiments of the present application. Obviously, the embodiments described are only some of the embodiments of the present application, and not all of them. Based on the embodiments in the present application, all other embodiments obtained by those skilled in the art without any creative work fall within the scope of the present application.

It should be noted that all directional indications (such as up and down) in the embodiments of the present application are used only to explain the relative position relationship, movement, etc. among components in a particular posture (as shown in the attached drawings), and if that particular posture changes, the directional indications change accordingly.

In addition, terms "first" and "second" in the present application are for descriptive purposes only, and are not to be construed as indicating or implying their relative importance or implicitly specifying the number of technical features indicated. Thus, the features with "first" and "second" may explicitly or implicitly include at least one such feature.

Moreover, the technical solutions of the various embodiments of the present application can be combined with each other, but only on the basis that those skilled in the art can achieve, when the combination of technical solutions appear to contradict each other or can not be achieved, it should be considered that this combination of technical solutions does not exist, and is not within the scope of the present application.

Figure 1:
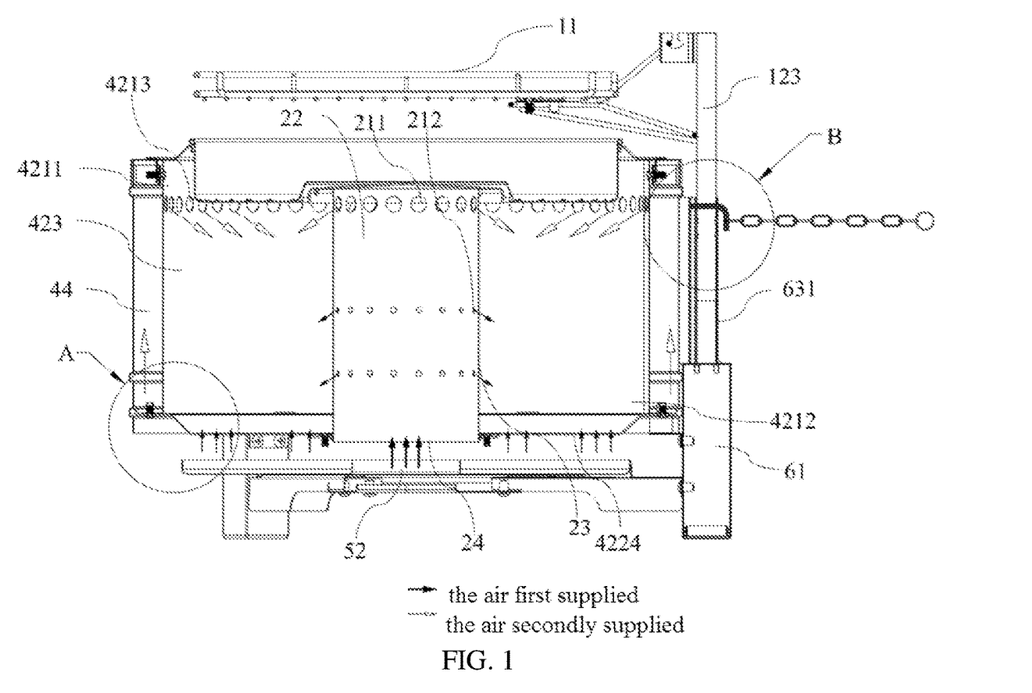
FIG. 1 is a schematic structural view of an oven according to some embodiments of the present application.
Figure 2:
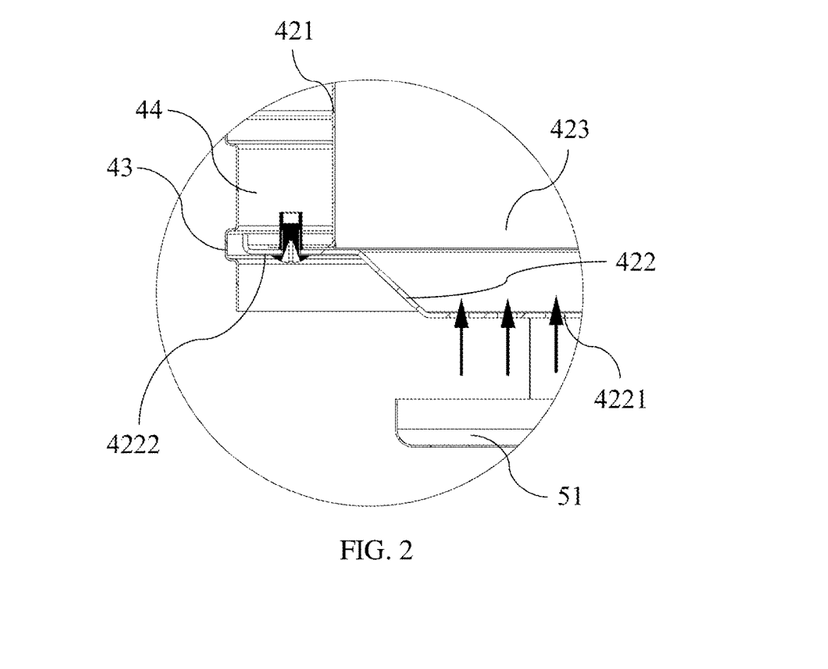
FIG. 2 is a partial enlarged structural view at A position in FIG. 1.
Figure 5:
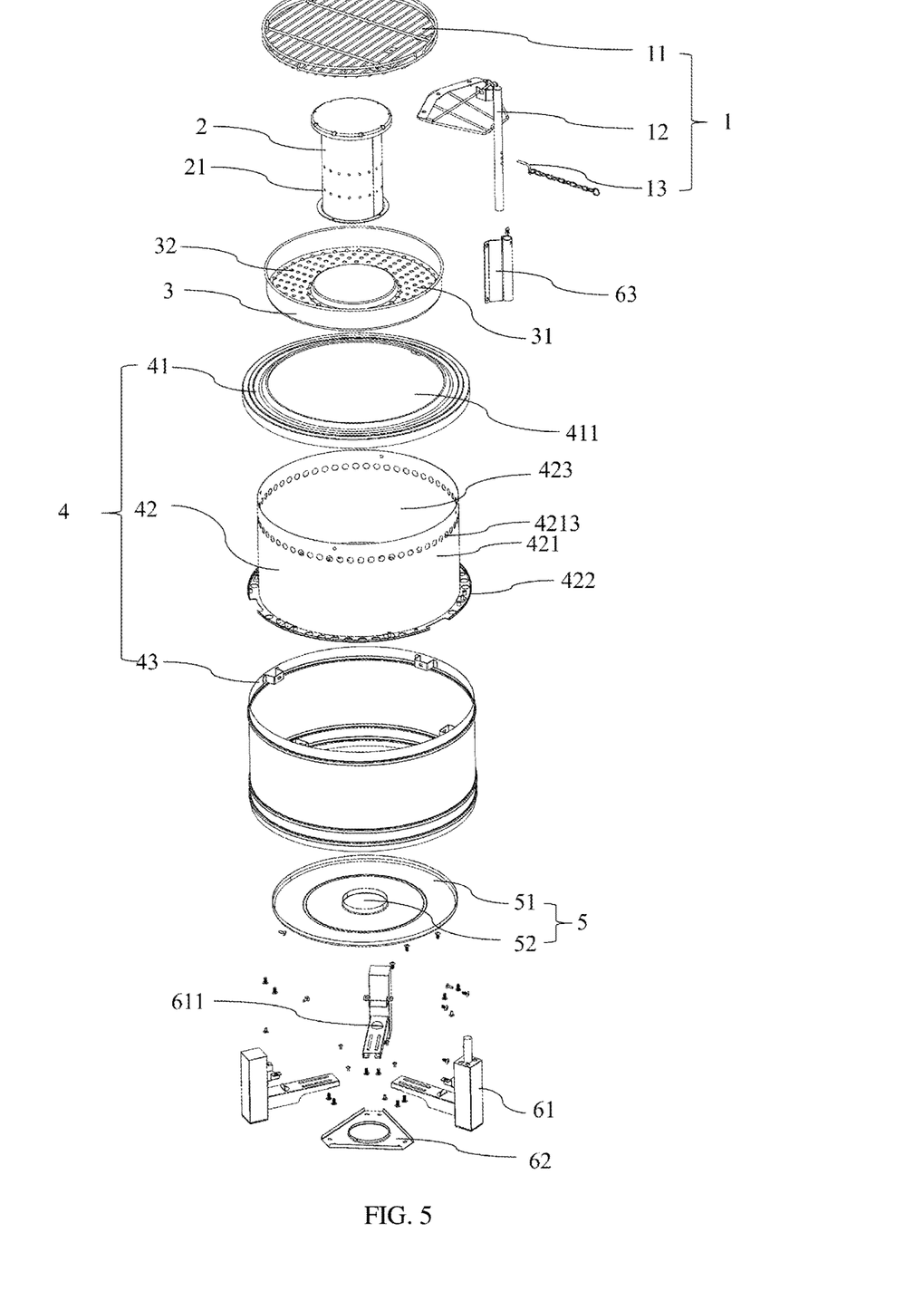
FIG. 5 is an exploded view of the oven according to some embodiments of the present application.

Referring to FIGS. 1, 2 and 5, the present application provides an oven, including a body assembly 4, an air inlet cylinder 2, and a support member 6.

The body assembly 4 includes a body 42, a top cover 41 and an enclosure 43. The body 42 includes a bottom plate 422 and a side plate 421 mounted on the bottom plate 422. The side plate 421 includes a top end 4211 and a bottom end 4212 opposite to the top end 4211. A first air inlet hole 4221 is provided on the bottom plate 422. A second air inlet hole is provided on a side of the side plate 421 near the top end 4211. The enclosure 43 is provided around the side plate 421. The enclosure 43, the side plate 421 and the top cover 41 form the first air inlet channel 44. The body 42 is provided with an inner cavity 423. The inner cavity 423 is configured to communicate the first air inlet channel 44 with the second air inlet hole 4213, and the inner cavity 423 is connected to an outside through the first air inlet hole 4221 and the first air inlet channel 44.

The air inlet cylinder 2 is provided in the inner cavity 423, and the air inlet cylinder 2 is provided with a second air inlet channel 22 for air to enter the inner cavity 423 from the outside.

The body assembly 4 is mounted on the support member 6.

In the above embodiment, the fuel is placed in the inner cavity 423 for combustion and the outside air is supplied first from the first inlet hole 4221 on the bottom plate 422 of the oven for the combustion of the fuel on the bottom plate 422. In addition, during the combustion of the fuel in the oven, the oven is heated and the outside air is heated by the side plate 423 to move upward from the bottom of the first air inlet channel 44 and then flows into the inner cavity 423 through the second air inlet hole 4213 for supply to an end of the combustion flame for the air secondary supplying to the inner cavity 423, to promote full combustion of insufficiently combusted fuel. In addition, during the combustion process, the air inlet cylinder 2 is heated and the air at the bottom of the air inlet cylinder 2 is at a higher temperature, the air below the air inlet cylinder 2 will enter the inner cavity 423 from the second inlet channel 22 for the air supplying to the center of the combustion flame, to promote full combustion of the fuel at the center of the combustion flame. In this way, the air is first supplied through the first air inlet hole 4221, and then the air is secondly supplied to an end of the combustion flame through the first air inlet channel 44 and the second air inlet hole 4213, and a supplemental air is supplied to the center of the combustion flame through the second air inlet channel 22, to ensure the full combustion of the fuel, to increase the fire temperature and reduce the generation of smoke or toxic gases, and also provide a special flame effect. Specifically, wood, charcoal and granular fuel with specifications greater than 6 mm can be placed in the inner cavity 423 for combustion, the inner cavity is suitable for various combustion materials, and a diameter of the first air inlet hole is less than 6 mm to prevent granular fuel from falling out of the first air inlet hole. The support member 6 may include a plurality of support legs 61, and the support legs 61 are detachably connected to the bottom plate 422 of the body 42 for supporting the body 42 and convenient mounting and transportation.

Referring to FIGS. 1 and 5, in one embodiment, the second air inlet channel 22 includes an air inlet 24 and an air outlet 21, and the air inlet cylinder 2 is provided with a housing 23. The air inlet 24 is located at a bottom of the housing 23 for communicating the outside air with the second air inlet channel 22, and the air outlet 21 is located on a side wall of the housing 23 for communicating the second air inlet channel 22 with the inner cavity 423. The outside air is heated in and near the air inlet 24, and the hot air rises along the second inlet channel 22 and exits from the air outlet 21 into the inner cavity 423 for a supplemental air supplying to the center of the combustion flame, to ensure full combustion of the fuel and increase the fire temperature, and also reduce the generation of smoke or toxic gases.

Referring to FIGS. 1 and 5, in one embodiment, the air outlet 21 includes a third air inlet hole 211 provided at a top of the side wall of the housing 23 and a fourth air inlet hole 212 provided at an end of the side wall of the housing 23 near the bottom. The third air inlet hole 211 is used to supplement the air for second supply to the top of the inner cavity 423 from the center of the combustion flame, and the fourth air inlet hole 212 is used to supplement the air for the first supply to the bottom of the inner cavity 423 from the center of the combustion flame.

Figure 4:
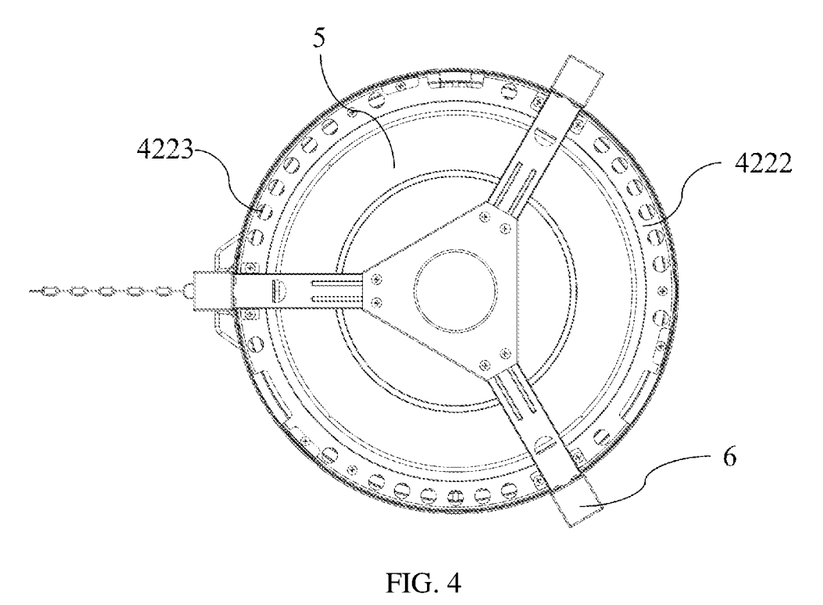
FIG. 4 is a bottom view of the oven according to some embodiments of the present application.

Referring to FIGS. 1, 2 and 4, in one embodiment, the bottom plate 422 is provided with an annular outer edge 4222 extending into the enclosure 43. The bottom plate 422 includes an inner cavity bottom 4224 and the annular outer edge 4222. The inner cavity bottom 4224 is located within the side plates, and the inner cavity bottom 4224 is provided with a first air inlet hole 4221. The annular outer edge 4222 is provided with ventilation ports 4223 spaced circumferentially for communicating the outside air with the first air inlet channel 44. During the fuel combustion process, the oven is heated and the outside air enters from the ventilation port 4223, and is heated by the side plate 421 to move upward in the first air inlet channel 44 and then flows into the inner cavity 423 from the second air inlet hole 4213 to form a secondary supplied air.

Referring to FIGS. 1 and 5, in one embodiment, the oven also includes a charcoal basin 3 and a baking net assembly 1. The top cover 41 is provided with a fire collection hole 411, and the charcoal basin 3 is mounted on the fire collection hole 411. The charcoal basin 3 can be placed on the fire collection hole 411 to facilitate free removal and placement of the charcoal basin 3. The bottom of the charcoal basin 3 is provided with a groove 31 and an ignition hole 32, the groove 31 is used to place the charcoal. The ignition hole 32 is used to communicate the groove 31 with the inner cavity 423. When the fuel in the inner cavity 423 is burnt, the flame ignites the charcoal in the cavity 31 through the ignition hole 32. In the baking state, the baking net assembly 1 is provided on a side of the charcoal basin 3 directly facing the groove 31, and the food is placed on the baking net assembly 1 and baked through the heat of the charcoal ignited in the groove 31.

Figure 3:
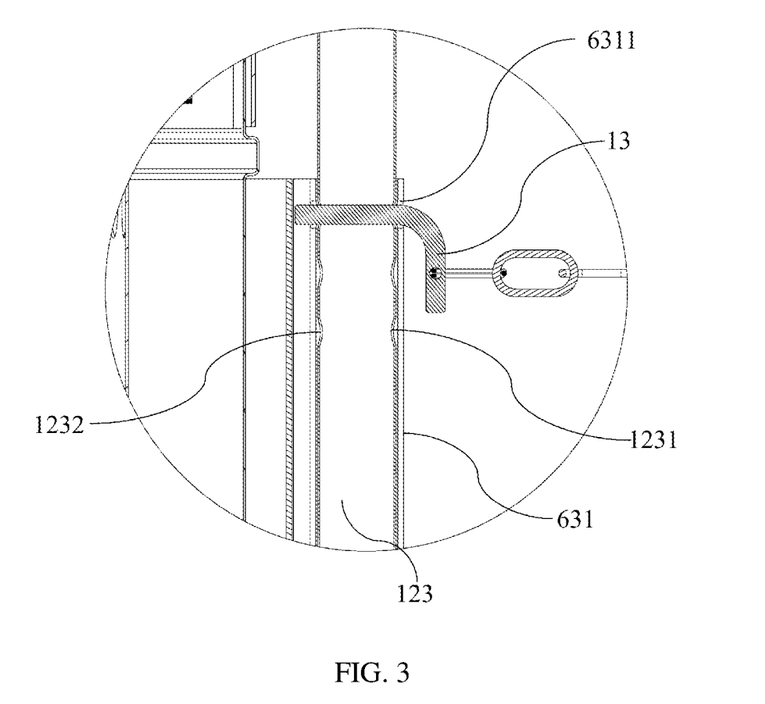
FIG. 3 is a partial enlarged structural view at B position in FIG. 1.
Figure 6:
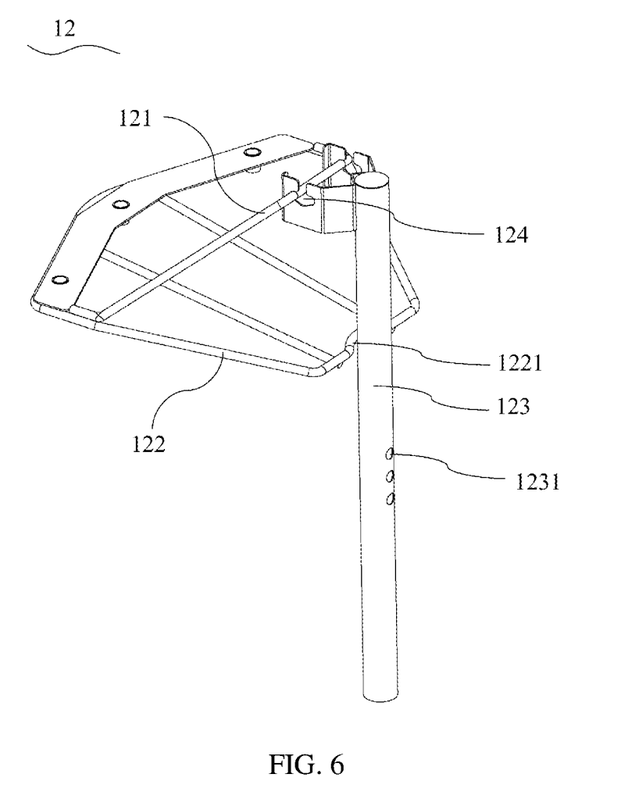
FIG. 6 is a schematic structural view of a mounting bracket according to some embodiments of the present application.

Referring to FIGS. 1, 3 and 6, in one embodiment, the support member 6 is mounted with a baking net bracket 63, the baking net bracket 63 includes a first cylinder-shaped mounting member 631. The first cylinder-shaped mounting member 631 is provided with a positioning hole 6311, the baking net assembly 1 includes a baking net 11, a mounting bracket 12 and a pin 13, the baking net 11 is mounted on the mounting bracket 12, the mounting bracket 12 includes a second cylinder-shaped mounting member 123. The second cylinder-shaped mounting member 123 is provided with a plurality of adjustment holes 1231 spaced about an axis of the second cylinder-shaped mounting member 123. The first cylinder-shaped mounting member 631 is sleeved on the second cylinder-shaped mounting member 123, the second cylinder-shaped mounting member 123 can move up and down in the first cylinder-shaped mounting member 631 during mounting. The required adjustment hole 1231 is selected to align positioning hole 6311, and then the pin 13 is inserted into the positioning hole 6311 and the selected adjustment hole 1231 to lock the first cylinder-shaped mounting member 631 and the second cylinder-shaped mounting member 123, thus to fix the baking net 11. Different adjustment holes 1231 are selected to lock with the positioning hole 6311, to get more baking heights to meet different baking needs.

Figure 7:
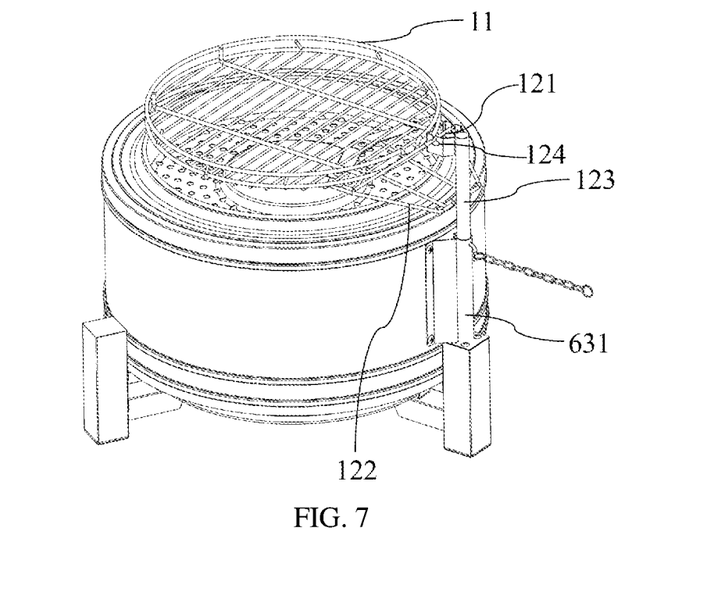
FIG. 7 is a schematic view of the oven in a baking state according to some embodiments of the present application.
Figure 8:
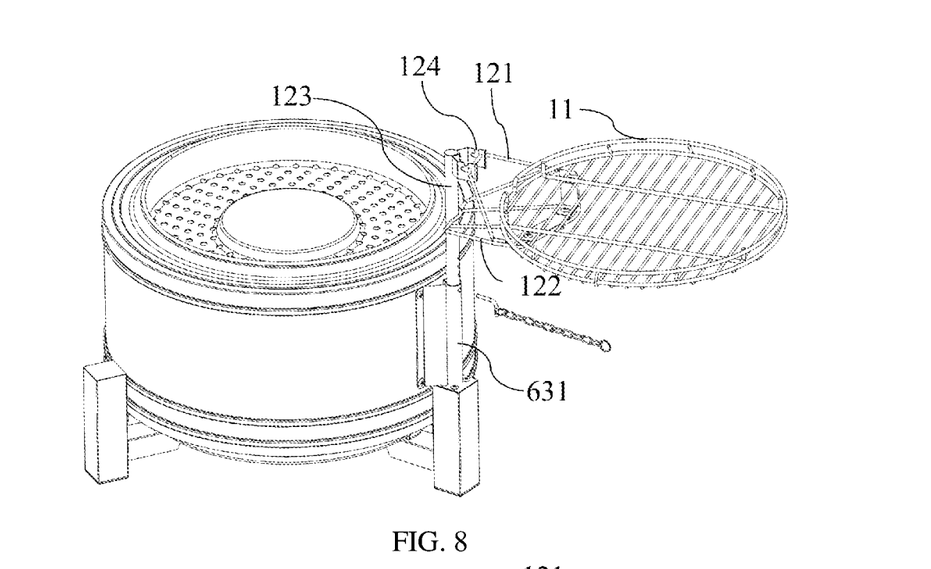
FIG. 8 is a schematic view of a baking net of the oven in an externally rotated state according to some embodiments of the present application.
Figure 9:
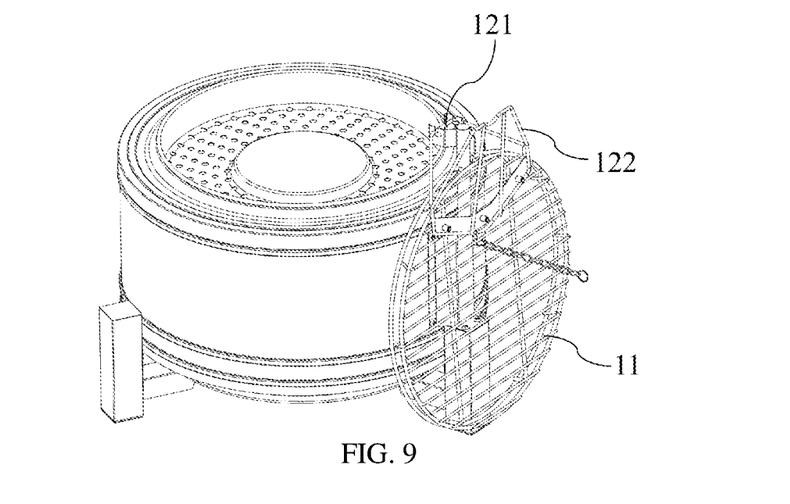
FIG. 9 is a schematic view of the baking net of the oven in an idle state according to some embodiments of the present application.

Referring to FIGS. 3, 6 and 7, in one embodiment, the second cylinder-shaped mounting member 123 also is provided with a penetration hole 1232 opposite to the adjustment hole 1231, and the number of penetration holes 1232 is equal to the number of adjustment holes 1231, and the penetration holes 1232 correspond to the adjustment holes 1231 one-in-one, so that when the baking net 11 needs to be removed from the baking area after the food is baked, etc., the pin 13 can be taken out and the baking net assembly 1 is rotated horizontally by 180°, then the pin 13 is inserted into the positioning hole 6311 and penetration hole 1232 to lock the first cylinder-shaped mounting member 631 and the second cylinder-shaped mounting member 123, the baking net 11 is rotated out over the baking area of the charcoal basin 3, to take the food conveniently for the people without being baked by the fire.

Referring to FIG. 6 to FIG. 9, in one embodiment, the mounting bracket 12 is provided with a clamping groove 124, a size of a bottom of the clamping groove 124 is larger than a size of an opening of the clamping groove 124. The mounting bracket 12 also includes a first lapping rod 121 and a second lapping rod 122, the first lapping rod 121 is clamped to the clamping groove 124, because the size of the opening of the clamping groove 124 is larger than the size of the bottom of the clamping groove 124, the first lapping rod 122 won't slide out after being clamped. The second lapping rod 122 is provided with a groove 1221 to better abut against an outer circumference of the second cylinder-shaped mounting member 123. In the baking state, the baking net 11 mounted on the mounting bracket 12 is supported by the force of the first lapping rod 121 being clamped to the clamping groove 124 and the force of the second lapping rod 122 abutting against the second cylinder-shaped mounting member 123. In the idle state, the baking net 11 is flipped out of the baking area, the first lapping rod 121 is still clamped to the clamping groove 124, and the second lapping rod 122 and the second cylinder-shaped mounting member 123 are released from the clamping groove 124, so that the baking net 11 is hung to an exterior of the second cylinder-shaped mounting member 123 away from the baking area. When needed, the first lapping rod 121 can also be disengaged from the opening of the clamping groove 124 and removed along with the baking net 11.

Referring to FIGS. 1 and 5, in one embodiment, the oven also includes an ash tray 5, which is provided on a side of the body 42 near the bottom plate 422, and the ash tray 5 includes a ventilation hole 52 and an annular groove 51. The annular groove 51 is provided under the first air inlet hole 4221. The ash generated by the combustion of fuel in the inner cavity 423 falls from the first air inlet hole 4221 to the annular groove 51 to avoid the continuous accumulation of ash in the inner cavity 423 from affecting combustion or the inconvenience of cleaning due to unreasonable collection of the ash, and the air inlet cylinder 2 faces the ventilation hole 52 to avoid the ash tray 5 from blocking the outside air from entering the air inlet cylinder 2.

Referring to FIG. 5, in one embodiment, the support member 6 includes limiting members 611 distributed circumferentially, the limiting members 611 can be correspondingly distributed on the support leg 61, and the ash tray 5 is movable upward among the limiting members 611, the ash tray 5 can be placed in a fixed position through the limiting members 611, to more conveniently make the annular groove 51 to face the first air inlet hole 4221 and the ventilation hole 52 to face the air inlet cylinder 2 when the ash tray 5 is placed. When more ash is accumulated in the annular groove 51, the ash tray 5 can be lifted off the limiting member 611 and removed from a side of the oven for ash cleaning.

The above is only an optional embodiment of the present application, not to limit the scope of the present application. Any equivalent structural transformation under the technical concept of the present application by using the content of the present application and the attached drawings, or direct/indirect application in other related technical fields are included in the scope of the present application.

What is claimed is:

1. An oven, comprising:
   a body assembly comprising a body, a top cover and an enclosure;
   the body comprising a bottom plate and a side plate mounted on the bottom plate;
   the side plate comprising a top end and a bottom end opposite to the top end;
   the bottom plate being provided with a first air inlet hole, a side of the side plate near the top end being provided with a second air inlet hole;
   the enclosure being provided around the side plate, wherein the enclosure, the side plate and the top cover form a first air inlet channel, and the body is provided with an inner cavity;
   the inner cavity being communicated with the first air inlet channel through the second air inlet hole, and the inner cavity being communicated with an outside through the first air inlet hole and the first air inlet channel;
   an air inlet cylinder provided in the inner cavity, and provided with a second air inlet channel for air entering the inner cavity from the outside; and
   a support member, the body assembly being mounted on the support member.

2. The oven according to claim 1, wherein the second air inlet channel comprises an air inlet and an air outlet, the air inlet cylinder is provided with a housing, the air inlet is located at a bottom of the housing and the air outlet is located on a side wall of the housing, to allow an outside air to enter from the air inlet and enter the inner cavity from the air outlet.

3. The oven according to claim 2, wherein the air outlet comprises a third air inlet hole provided at a top of the side wall of the housing and a fourth air inlet hole provided at an end of the side wall of the housing near the bottom of the housing.

4. The oven according to claim 1, wherein the bottom plate is provided with an annular outer edge extending to the enclosure, the annular outer edge is provided with ventilation ports spaced circumferentially, and the ventilation ports are configured to communicate the outside air with the first air inlet channel.

5. The oven according to claim 1, wherein the oven further comprises a charcoal basin and a baking net assembly, the top cover is provided with a fire collection hole, the charcoal basin is mounted in the fire collection hole;
   a bottom of the charcoal basin is provided with a groove and an ignition hole, the ignition hole is configured to communicate the groove with the inner cavity; and
   the baking net assembly is located on a side of the charcoal basin directly facing the groove.

6. The oven according to claim 5, wherein the support member is mounted with a baking net bracket, the baking net bracket comprises a first cylinder-shaped mounting member, the first cylinder-shaped mounting member is provided with a positioning hole;
   the baking net assembly comprises a baking net, a mounting bracket and a pin, the baking net is mounted on the mounting bracket;
   the mounting bracket comprises a second cylinder-shaped mounting member, the second cylinder-shaped mounting member is provided with a plurality of adjustment holes that are spaced about an axis of the second cylinder-shaped mounting member;
   the first cylinder-shaped mounting member is sleeved on the second cylinder-shaped mounting member; and
   the pin is inserted into the positioning hole and one of the plurality of adjustment holes to lock the first cylinder-shaped mounting member and the second cylinder-shaped mounting member.

7. The oven according to claim 6, wherein the second cylinder-shaped mounting member is further provided with penetration holes opposite to the plurality of adjustment holes, the number of penetration holes is equal to the number of adjustment holes, and the penetration holes correspond to the adjustment holes one-in-one.

8. The oven according to claim 6, wherein the mounting bracket is provided with a clamping groove, a size of a bottom of the clamping groove is larger than a size of an opening of the clamping groove;
    the mounting bracket further comprises a first lapping rod and a second lapping rod, the first lapping rod is clamped to the clamping groove, the second lapping rod is provided with a concave portion, and the concave portion is abutted against the second cylinder-shaped mounting member.

9. The oven according to claim 8, wherein the support member comprises limiting members distributed circumferentially, and the ash tray is movable upward among the limiting members.

10. The oven according to claim 1, wherein the oven further comprises an ash tray, the ash tray is provided on a side of the body near the bottom plate, the ash tray comprises a ventilation hole and an annular groove, the annular groove is provided directly under the first air inlet hole, and the air inlet cylinder faces the ventilation hole.

\* \* \* \* \*